United States Patent
Kawasaki et al.

[11] Patent Number: 6,088,645
[45] Date of Patent: Jul. 11, 2000

[54] CONTROL DEVICE AND CONTROL METHOD FOR TRANSMISSION WITH CLUTCH

[75] Inventors: Nobuaki Kawasaki; Takashi Kuse, both of Komatsu; Akira Shibata, Kanazawa, all of Japan

[73] Assignee: Komatsu Ltd., Tokyo, Japan

[21] Appl. No.: 09/214,563

[22] PCT Filed: Jul. 4, 1997

[86] PCT No.: PCT/JP97/02327

§ 371 Date: Jan. 7, 1999

§ 102(e) Date: Jan. 7, 1999

[87] PCT Pub. No.: WO98/01687

PCT Pub. Date: Jan. 15, 1998

[30] Foreign Application Priority Data

Jul. 8, 1996 [JP] Japan .................................. 8-197100

[51] Int. Cl.[7] .......................... B60K 41/18; B60K 41/02; F16H 5/40
[52] U.S. Cl. ................................. 701/67; 701/66; 701/53; 701/51; 477/168; 477/45; 477/70; 477/79; 477/143
[58] Field of Search ................................. 701/67, 66, 51, 701/53; 477/45, 70, 79, 168, 143

[56] References Cited

U.S. PATENT DOCUMENTS

| | | | |
|---|---|---|---|
| 4,836,057 | 6/1989 | Asayama et al. | 74/867 |
| 4,943,920 | 7/1990 | Hiramatsu et al. | |
| 5,224,577 | 7/1993 | Falck et al. | 74/336 R |
| 5,449,329 | 9/1995 | Brandon et al. | 477/70 |
| 5,743,826 | 4/1998 | Usuki et al. | 477/98 |
| 5,778,330 | 7/1998 | McKee | 701/62 |
| 5,809,441 | 9/1998 | McKee | 701/51 |
| 5,819,192 | 10/1998 | Wakahara et al. | 701/67 |
| 5,902,344 | 5/1999 | Eike et al. | 701/67 |

FOREIGN PATENT DOCUMENTS

| | | |
|---|---|---|
| 62-132060 | 6/1987 | Japan . |
| 62-261553 | 11/1987 | Japan . |
| 63-266220 | 11/1988 | Japan . |
| 2-203065 | 8/1990 | Japan . |
| 3-234925 | 10/1991 | Japan . |
| 4-366063 | 12/1992 | Japan . |
| 8-254262 | 10/1996 | Japan . |

*Primary Examiner*—William A. Cuchlinski, Jr.
*Assistant Examiner*—Olga Hernandez
*Attorney, Agent, or Firm*—Sidley & Austin

[57] ABSTRACT

The present invention is a control device and a control method for a transmission with a clutch, by which the clutch is smoothly coupled without generation of shocks or the like in a vehicle. For this purpose, in order to supply a large flow rate initially, a large trigger command value is outputted for a first predetermined period of time to supply a first predetermined quantity to a clutch chamber (8); and before the clutch piston (8A) completes its movement, the large trigger command value is changed to a smaller command value to supply a flow rate which is smaller than that at the time of the first predetermined quantity; and a flow rate detecting valve (20) detects when the clutch chamber (8) becomes full; so that when a period of time, required for making the clutch chamber (8) full, does not fall within a predetermined range of time intervals, a second predetermined period of time, which is a correction of the first period of time by increasing or decreasing so as to cause the period of time, required for making the clutch chamber full, to fall within the predetermined range of time intervals, is outputted to the pressure control valve (10).

15 Claims, 7 Drawing Sheets

F I G. 6
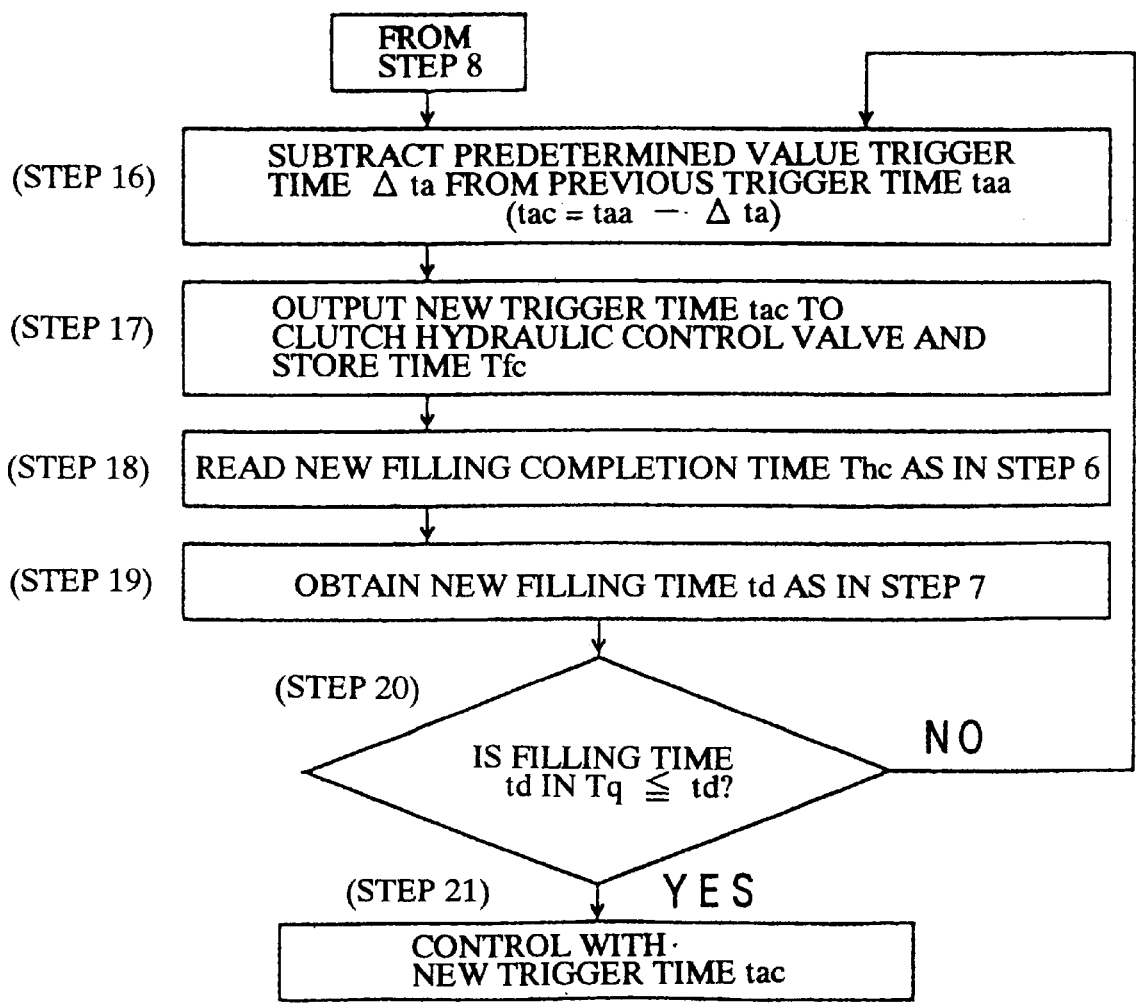

CONTROL DEVICE AND CONTROL METHOD FOR TRANSMISSION WITH CLUTCH

TECHNICAL FIELD

The present invention relates to a control device and a control method for a transmission with a clutch, and the invention particularly relates to a control device and a control method for a transmission with a clutch which is preferable for a construction vehicle, such as a wheel loader, in which tires are used.

BACKGROUND ART

Japanese Laid-open Patent No. 62-132060 discloses a control method for a transmission by which a clutch of the transmission is smoothly engaged. The configuration of the proposed clutch hydraulic control device is shown in a sectional view in FIG. 8 and in a hydraulic circuit diagram in FIG. 9. In FIG. 9, a clutch hydraulic control device 50 operates a clutch hydraulic control valve 52 in response to a command from a controller 51, and sends pressurized oil from a hydraulic pump 53 to a clutch chamber 54 to achieve a smooth engagement. The clutch hydraulic control valve 52 includes valves for a forward gear 52A, a reverse gear 52B, a first speed gear, a second speed gear, and the like.

The clutch hydraulic control valve 52 includes a pressure control valve 60 for controlling the clutch oil pressure, a flow rate detecting valve 70 for detecting the pressurized oil flowing from the hydraulic pump 53 to the clutch chamber 54 via the pressure control valve 60 and the flow rate detecting valve 70, and a filling completion detecting sensor 80 (hereinafter called a filling sensor 80) for detecting that the clutch chamber 54 is filled with oil, that is, the filling is completed. The pressure control valve 60 is controlled by the controller 51, and a detection signal from the filling sensor 80 is inputted into the controller 51.

The pressure control valve 60, the flow rate detecting valve 70, and the filling sensor 80 are mounted on a body 90 as shown in FIG. 8. The body 90 is provided with a pump port 91 into which pressurized oil flows from the hydraulic pump 53, an output port 92 which supplies pressure oil into the clutch chamber 54, and drain ports 93 and 94, shown in FIG. 8, which return oil returning or leaking from the clutch chamber 54 to a tank 95. The pressure control valve 60 includes a pressure control valve spool 61 (hereinafter, called a control valve spool 61), a piston 62, a proportional solenoid 63, and a first spring 64. The right end portion of the control valve spool 61 is abutted to a plunger 63a of the proportional solenoid 63, and the spring 64 is abutted to the left end portion thereof, thereby pressing the control valve spool 61 toward the proportional solenoid 63 side. The pressure in an oil passage 67 (the pressure to the clutch chamber 54) acts on an oil chamber 65 inside the spool 61, which is defined by the control valve spool 61 and the piston 62 in an oil passage 66 formed inside the control valve spool 61.

The flow rate detecting valve 70 includes a flow rate detecting valve spool 71 (hereinafter, called a detecting valve spool 71), a second spring 72, and a third spring 73. Three raised portions are formed on the detecting valve spool 71, and these raised portions divisionally form a first oil chamber 74, a second oil chamber 75, and a third oil chamber 76. A hole 77 is provided in the raised portion of the detecting valve spool 71 which is between the second oil chamber 75 and the third oil chamber 76. The detecting valve spool 71 has three different pressure receiving areas Aa, Ab, and Ac, and allows these areas to have the relationships (Aa+Ac)>Ab, and Ab>Ac. The second spring 72 is abutted to and inserted into the left end portion of the detecting valve spool 71, and the third spring 73 is abutted to and inserted into the right end portion thereof. When pressure is not generated in the second oil chamber 75 and the third oil chamber 76, the detecting valve spool 71 is held in a neutral position where the second spring 72 and the third spring 73 respectively have free length. Accordingly, when the detecting valve spool 71 is not operated (the illustration shows a situation in which it is operated), the pressurized oil flowing into the flow rate detecting valve 70 via the pump port 91 stays in the first oil chamber 74. In the above, the second spring 72 and the third spring 73 work as springs for returning the detecting valve spool 71, and when the pressurized oil is not supplied, the detecting valve spool 71 is designed to be in its neutral position.

The filling sensor 80 includes a sensing pin 81, a first resistance Ra and a second resistance Rb which are connected in series, and an insulator 82. The sensing pin 81 is attached at the body 90 with the insulator 82 between them in the position where the detecting spool 71 abuts to the right end portion thereof when it is moved. A lead wire 83 is extended from the sensing pin 81, and the lead wire 83 is connected to a point between the first resistance Ra and the second resistance Rb. A predetermined direct voltage is applied across the first resistance Ra and the second resistance Rb, and the body 90 is grounded by means of a ground wire 84.

Next, the operation in the aforesaid configuration will be explained. When the clutch of an applicable speed gear is engaged, the controller 51 outputs a current Ia (at point in time Ta) as a trigger command to the proportional solenoid 63 of the pressure control valve 60. Thereafter, the controller 51 lowers the command current Ia to an initial pressure command current Ip corresponding to the initial pressure valve Pp of the clutch oil pressure, and waits until the filling is finished in this state.

As a result of inputting the current Ia of the trigger command, the plunger 63a of the proportional solenoid 63 moves the control valve spool 61 in the leftward direction in the drawing. Thereby, the pressurized oil from the hydraulic pump 53 flows into the second oil chamber 75 of the detecting valve spool 71 via the pump port 91, the control valve spool 61, and the oil passage 67 (the arrow Ya shown in FIG. 8). The pressurized oil, which has flowed into the second oil chamber 75, flows into the clutch chamber 54 via the hole 77 of the detecting valve spool 71, the third oil chamber 76, and the output port 92. At this time, the hole 77 causes a differential pressure between the second oil chamber 75 and the third oil chamber 76, thereby moving the detecting valve spool 71 in the leftward direction in the drawing. As a result, the first oil chamber 74 and the second oil chamber 75, which have been closed to each other by the body 90, are now opened to each other. The pressurized oil from the hydraulic pump 53 then passes through the opened portion (Yb), merges with the oil Ya from the aforesaid control valve spool 61, and flows into the clutch chamber 54 via the hole 77 of the detecting valve spool 71, the third oil chamber 76, and the output port 92. The pressurized oil continues to flow until the clutch chamber 54 becomes full.

When the clutch chamber 54 is filled with oil, the filling is finished, the oil does not flow any more, and the differential pressure in the hole 77 between the second oil chamber 75 and the third oil chamber 76 no longer exists. Thereby, the detecting valve spool 71 is moved in the rightward direction, and is returned to its neutral position.

Further, at this time, due to the relationship among the areas of the pressure receiving areas of the detecting valve spool 71, that is, (Aa+Ac)>Ab, and the force to which the returning force of the second spring 72 is added, the detecting valve spool 71 is moved in the rightward direction. When the detecting valve spool 71 is returned, the pressurized oil from the hydraulic pump 53 fills the clutch chamber 54, and causes chute pressure. Further, the detecting valve spool 71 is moved in the rightward direction, thereby bringing the detecting valve spool 71 into contact with the sensing pin 81. By this contact, it is detected that the clutch chamber 54 is filled with oil, and that the filling is finished.

As described above, in the aforesaid art, at a point in time when the clutch chamber 54 is completely filled, a peak pressure occurs as a result of a delay in the response of the pressure control valve 60 and the flow rate detecting valve 70. The peak pressure doesn't matter in a higher throttle area at higher engine speed. However, a disadvantage in that a shock to the vehicle or noise, to thereby make the operator feel uncomfortable, occurs especially in a low throttle area at lower engine speed in a construction vehicle which has tires, such as a wheel loader, which requires smooth engagement of the clutch in both the forward movement and the reverse movement. In order to eliminate the disadvantage, it is suitable to reduce the flow rate of the pressurized oil supplied to a clutch chamber 8 (see FIG. 1) before the clutch chamber 8 proposed by the present invention is filled with the pressurized oil, thereby achieving a smooth engagement of the clutch. However, unless the engagement of the clutch is achieved in a certain period of time, a disadvantage occurs, thereby giving the operator an uncomfortable feeling that a slow start is being made. When a control is to be carried out to smoothly engage the clutch in a certain period of time for the aforesaid reason, the following difficulties occur. Specifically, the first one is that the volume of the clutch chamber is not fixed, but is "varied" according to manufacturing errors of the components, such as a clutch disc, a clutch piston, or a piston case. The second one is that the clutch disc can be worn, thereby varying the volume of the clutch chamber.

FIG. 10 is a graph for explaining the above description, and shows a situation in which the engine speed is in a lower range. The elapsed time T needed to fill the clutch chamber 54, is plotted in the axis of abscissa, and the volume V of the clutch chamber 54 is plotted in the axis of ordinates. In the graph, the line L represents the pressurized oil supply to the clutch chamber 54, the supply flow rate is larger along the line LA extending from the engaging period in time 0 to the period in time Ta, and a smaller supply flow rate is shown by the solid line LB extending from the point in time Ta. The gradient of the solid line LB from the period in time Ta shows the increase ratio of the supply rate of the pressurized oil which does not cause a shock or a noise in the vehicle. The portion between the points in time Tb and Tc shows an allowable engaging time interval when the engine speed is in a lower range. The portion between the values Vb and Vc for the volume of the clutch chamber 54 shows variations in the volume of the clutch chamber 54. The clutch is assembled with the volume Vd which is between the variations Vb and Vc of the volume of the clutch chamber 54. It is difficult to match a point of completing the engagement of the clutch, that is, a completion point Ps of the solid line LB, to the volume Vd as well as to the allowable engaging time interval Tb to Tc. Specifically, it is followed by a difficulty to place the completion point Ps within the range between the points PA and PB on the solid line LC. In addition, even if the point PS temporally falls in a right place, when the clutch disc is worn out, the engaging time goes out of the allowable engaging range between the points in time Tb and Tc, which becomes a disadvantage.

A SUMMARY OF THE INVENTION

The present invention is made to eliminate the aforesaid disadvantages of the prior art, and its object is to provide a control device and a method for a transmission with a clutch by which adjustment is facilitated and the clutch is smoothly coupled without generating a shock, a noise caused by coupling the clutch, or the like, in a vehicle even when the engine speed is in a low range.

A first configuration of a control device for a transmission with a clutch according to the present invention is for a transmission with a clutch which supplies oil from a hydraulic pump to a clutch chamber selected from a plurality of speed gears, which moves a clutch piston in the selected clutch chamber, and which allows the clutch piston to press to engage the clutch to thereby transmit engine power by the selected speed gear. The control device for the transmission with a clutch supplies oil into the selected clutch chamber via a pressure control valve and a flow rate detecting valve of a clutch control valve assembly, detects that the selected clutch chamber is filled with oil by means of the flow rate detecting valve, and smoothly engages the clutch by means of the pressure control valve on receiving a speed change command from a controller, and is characterized in that the clutch chamber which is supplied with oil from the hydraulic pump, has a predetermined volume in which the clutch piston is moved, and the controller outputs to the pressure control valve a large trigger command value for a first predetermined period of time to supply a first predetermined quantity of oil at a large initial flow rate to the clutch chamber from the pressure control valve via the flow rate detecting valve; then before the clutch piston completes its movement, changes the large trigger command value to a smaller command value, to supply oil to the clutch chamber at a flow rate which is smaller than that at the time of the first predetermined quantity; and detects, by means of the flow rate detecting valve, when the clutch chamber becomes full; and when the period of time from the period in time at which the speed change command is received until the period in time at which the clutch chamber becomes full does not fall within a predetermined time interval, outputs to the pressure control valve a second predetermined period of time which is a correction of the first predetermined period of time by increasing or decreasing the first predetermined period of time so as to cause the period of time required for making the clutch chamber full to fall within the predetermined time interval.

According to this aforesaid configuration, a large quantity of oil is initially supplied to the clutch chamber, having a predetermined volume, and then an extremely small quantity of oil is supplied thereto by reducing the flow rate, before the clutch chamber becomes full; therefore, the clutch can be engaged very smoothly. A shock occurring at the time of engagement or a noise made by engaging the clutch, which is propagated to the operator, is eliminated. In addition, even when an extremely small quantity of oil is supplied by changing the flow rate, the quantity is changed from a large quantity to the extremely small quantity in accordance with a variation in the clutch volume, or a change in the clutch volume resulting from abrasion while being used; therefore, the period of time required for engaging the clutch can be made to fall within the predetermined time interval. Thereby, the operator doesn't feel a delay in engaging the clutch. Especially in a construction vehicle, such as a wheel loader, in which tires are used and a shock, a noise, or the like occurring to the vehicle is easily propagated, the clutch is engaged with an extremely small quantity of oil; therefore, the vehicle is smoothly started, and the speed is smoothly changed. Further, in such vehicle, the clutch can be smoothly coupled without generating a shock, a noise, or the like, which is felt when the engine speed is in a low range. At predetermined intervals, the period of time required for engaging the clutch is made to fall within a predetermined standardized time, either automatically or responsive to adjusting by the operator; therefore, the clutch can be adjusted easily.

A second configuration of a control device for a transmission with a clutch according to the present invention is for a transmission with a clutch which supplies oil from a hydraulic pump to a clutch chamber selected from a plurality of speed gears, which moves a clutch piston in the selected clutch chamber, and which allows the clutch piston to press to engage the clutch to thereby transmit engine power by the selected speed gear the control device for a transmission with a clutch supplies oil to the selected clutch chamber via a pressure control valve which receives a speed change command, includes a controller for controlling the pressure control valve to smoothly engage the clutch, is characterized by including a fullness detecting sensor, for detecting that the clutch chamber is filled with pressurized oil, and is further characterized in that:

the clutch chamber is supplied with oil from the hydraulic pump and has a predetermined volume in which the clutch piston is moved, and in that the controller passes a large trigger command value to the pressure control valve for a first predetermined period of time to supply a first predetermined quantity of oil to the clutch chamber at a large initial flow rate; then before the clutch piston completes its movement, changes the large trigger command value to a smaller command value and to supply oil at a flow rate, which is smaller than that at the time of the first predetermined quantity, to make the clutch chamber full; and detects that the clutch chamber becomes full by means of the fullness detecting sensor; and when the period of time from the period in time at which the speed change command is received until the point in time at which the clutch chamber becomes full does not fall within a predetermined time interval, outputs to the pressure control valve a second predetermined period of time which is a correction of the first predetermined period of time by increasing or decreasing the first predetermined period of time so as to cause the period of time required for making the clutch chamber full to fall within the predetermined time interval.

According to this second configuration, the operational effects are obtained as in the first configuration. Further, an ordinary pressure control valve and a pressure detector can be used.

A control method for a transmission with a clutch according to the present invention is a control method for a transmission with a clutch which supplies oil from a hydraulic pump to a clutch chamber, selected from a plurality of speed gears, via a pressure control valve which receives a speed change command, which moves a clutch piston in the selected clutch chamber, and which allows the clutch piston to press to engage the clutch to thereby transmit engine power by the selected speed gear. This method is characterized by including the steps of:

on supplying oil from the hydraulic pump, passing a large trigger command value to the flow control valve for a first predetermined period of time to initially flow oil at a large flow rate to the clutch chamber having a predetermined volume in which the clutch piston is moved;

before the clutch piston completes its movement, changing the large trigger command value to a smaller command value to supply oil at a flow rate which is smaller than that at the time of the trigger command value, to make the clutch chamber full; and controlling a period of time which is required for making the clutch chamber full, to fall within a predetermined time interval by increasing or decreasing the first predetermined period of time by a predetermined unit of time when the period of time, from the period in time at which the speed change command is outputted until the period in time at which the clutch chamber becomes full, does not fall within the predetermined time interval.

According to the aforesaid method, the operational effects are obtained as in the first configuration of the aforesaid device.

BRIEF DESCRIPTION OF THE DRAWINGS

FIG. 6 is another part of the flow chart continued from FIG. 4;

BEST MODE FOR CARRYING OUT THE INVENTION

A preferred embodiment of the present invention will now be described with reference to the attached drawings.

Figure 1:
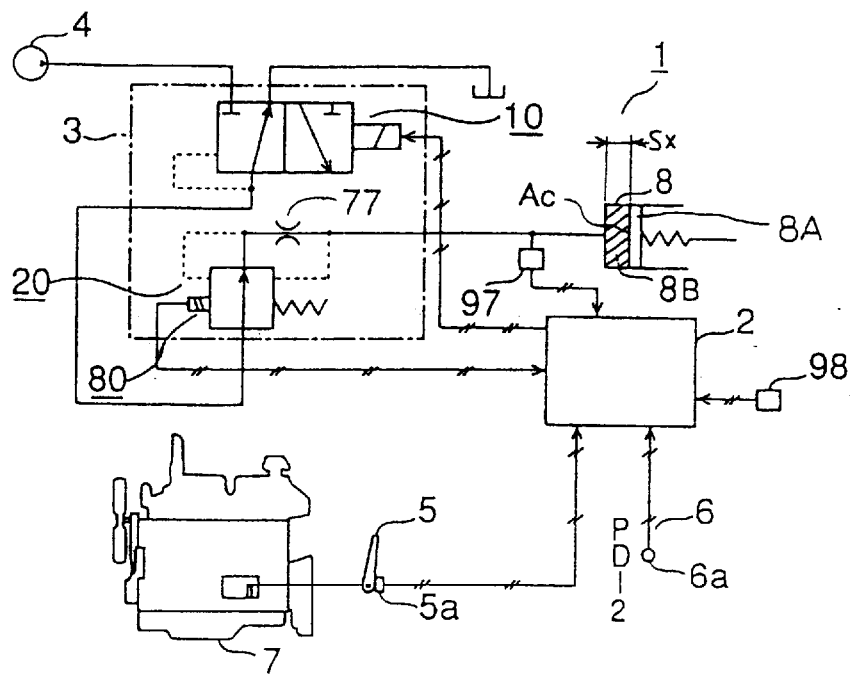
FIG. 1 is a schematic diagram of a control device for a transmission with a clutch according to an embodiment of the present invention.

In FIG. 1, a control device 1 for a transmission with a clutch (hereinafter, called a control device 1) is mounted on a wheeled type of wheel loader having a working device, which is not illustrated. The controller 1 includes a controller 2, a clutch hydraulic control valve 3, and a hydraulic pump 4. A signal from an accelerator lever 5 and a signal from a transmission lever 6, for selecting a forward gear, a reverse gear, or a speed gear of the transmission, are inputted. The accelerator lever 5 and the transmission lever 6 are respectively provided with position sensors 5a and 6a.

In this configuration, an operator sets the speed of the engine 7 by means of the accelerator lever 5, and makes a gear selection with the transmission lever 6 to travel the wheel loader. At this time, in the control device 1, the clutch hydraulic control valve 3 is operated in response to a command from the controller 2, and pressurized oil from the hydraulic pump 4 is sent to a clutch chamber 8, thereby achieving a smooth engagement, without causing a shock or making a noise or the like, to allow the wheel loader to travel with the clutch being smoothly coupled. The clutch includes a multiple disc clutch, which is pressed by a clutch piston 8A in the clutch chamber 8, slidably moved responsive to the pressurized oil in the clutch chamber 8, and which is engaged when the pressure of the clutch chamber 8 is raised to a predetermined pressure. The clutch chamber 8 has a predetermined volume Vx (corresponding to the slashed portion shown by a symbol 8B) according to the movement of the piston 8A, from the point in time, at which the piston 8A contacts the clutch in response to the pressurized oil from the hydraulic pump 4, until the point in time it presses the clutch and effects coupling.

Figure 2:
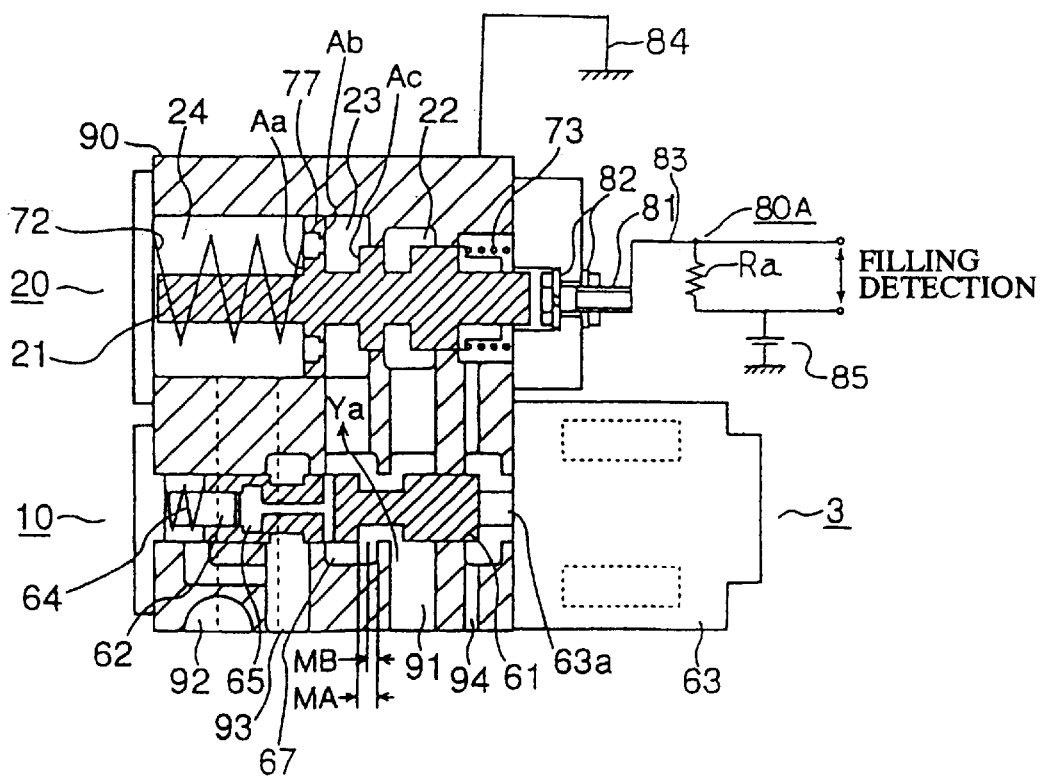
FIG. 2 is a sectional view of a clutch hydraulic control valve according to the embodiment of the present invention.

In FIGS. 1 and 2, the clutch hydraulic control valve 3 includes a pressure control valve 10, for controlling the clutch oil pressure; a flow rate detecting valve 20, for detecting the flow rate of the pressurized oil flowing into the clutch chamber 8 from the hydraulic pump 4 via the pressure control valve 10 and the flow rate detecting valve 20; and a filling sensor 80A, for detecting the completion of filling. The pressure control valve 10 is controlled by the controller 2, and a detection signal from the filling sensor 80A is inputted into the controller 2. The pressure control valve 10, which is configured as in the prior art, includes a pressure control valve spool 61 (hereinafter, called a control valve spool 61), a piston 62, a proportional solenoid 63, and a first spring 64.

The flow rate detecting valve 20, which is generally configured as in the prior art, includes a flow rate detecting valve spool 21 (hereinafter, called a detecting valve spool 21), a second spring 72, and a third spring 73. Three protruded portions are formed on the detecting valve spool 21, and these protruded portions divisively form a first oil chamber 22, a second oil chamber 23, and a third oil chamber 24. A hole 77 is provided in the protruded portion of the detecting valve spool 21 which extends between the second oil chamber 23 and the third oil chamber 24. The detecting valve spool 21 has three different pressure receiving areas Aa, Ab, and Ac, as in the prior art, and allows these areas to have the relationships (Aa+Ac)>Ab, and Ab>Ac.

The filling sensor 80A includes a sensing pin 81, an insulator 82, a first resistance Ra connected to the sensing pin 81, and a power source 85. The sensing pin 81 is attached at the body 90 with the insulator 82 between them in the position at which the sensing pin 81 is brought into contact with the right end portion of the detecting valve spool 21 when the detecting valve spool 21 is moved. Further, a lead wire 83 extends from the sensing pin 81, and the lead wire 83 is connected to the first resistance Ra. A predetermined direct voltage is applied to the first resistance Ra, and the body 90 is grounded by a ground wire 84. According to this configuration, when the detecting valve spool 21 is brought into contact with the sensing pin 81, current from the power source 85 flows through the first resistance Ra. The potential difference across the first resistance Ra is detected, thereby detecting that the clutch chamber 8 is filled.

Next, the difference between the configurations of the prior art and the embodiment of the present invention will be explained.

Figure 8:
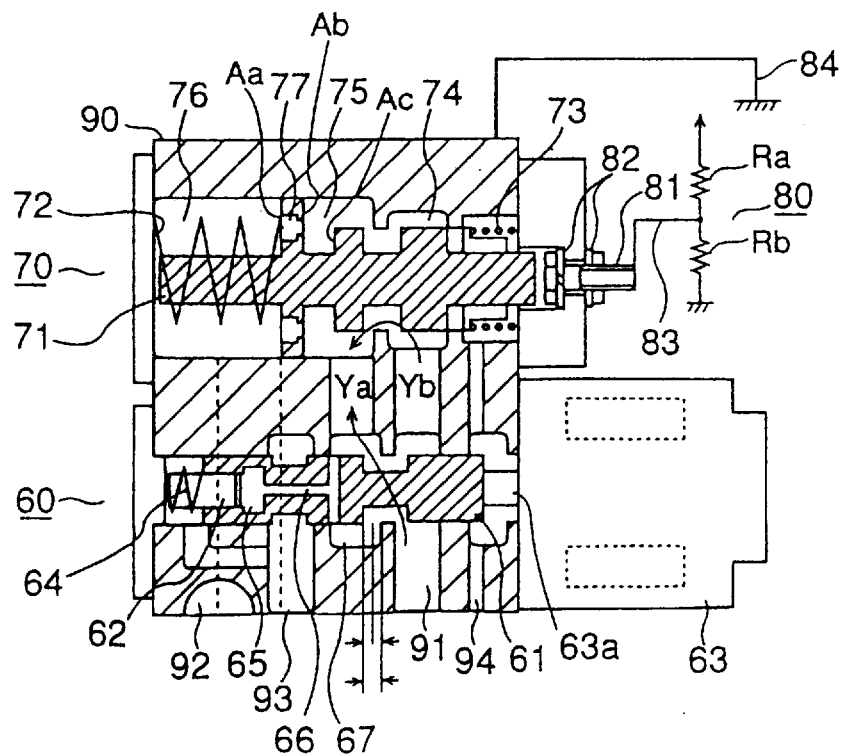
FIG. 8 is a sectional view of a clutch hydraulic control valve of the prior art.
Figure 9:
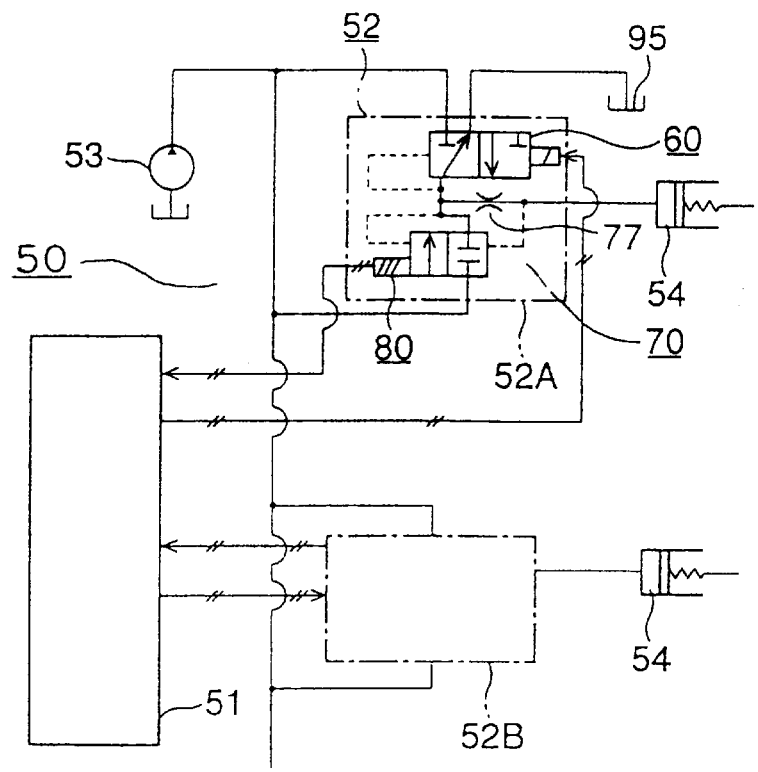
FIG. 9 is a schematic diagram of a control device for a transmission with a clutch of the prior art.

In the prior art, as described above, the pressurized oil from the hydraulic pump 53 flows into the second oil chamber 75 of the detecting valve spool 71 via the pump port 91, the control valve spool 61, and the oil passage 67. The pressurized oil, which has flowed into the second oil chamber 75, flows into the clutch chamber 54 via the hole 77 in the detecting valve spool 71, the third oil chamber 76, and the output port 92. At this time, the hole 77 causes a differential pressure between the second oil chamber 75 and the third oil chamber 76, thereby moving the spool 71 in the leftward direction in the drawing. As a result, the first oil chamber 74 and the second oil chamber 75, which were closed to each other by the body 90, are now opened to each other. The pressurized oil from the hydraulic pump 53 then passes through the opened portion, merging with the oil Ya from the control valve spool 61, and flows into the clutch chamber 54 via the hole 77 of the detecting valve spool 71, the third oil chamber 76, and the output port 92. The pressurized oil continues to flow until the clutch chamber 54 is filled. However, explaining with use of FIGS. 8 and 9 of the prior art, in the present embodiment the first oil chamber 74 and the second oil chamber 75 would still be closed to each other. Accordingly, oil in the prior art, which is "the pressurized oil from the hydraulic pump 53, passing through the opened portion, merging with the oil Ya from the control valve spool 61, and flowing into the clutch chamber 54" doesn't exist. Specifically, the oil flow shown by the arrow Yb is eliminated in the present embodiment.

Returning to FIGS. 1 and 2 of the present embodiment, the pressurized oil from the hydraulic pump 4 flows into the second oil chamber 23 of the detecting valve spool 21 via the pump port 91, the control valve spool 61, and the oil passage 67 (shown by the arrow Ya). The pressurized oil, which has flowed into the second oil chamber 23, flows into the clutch chamber 8 via the hole 77 of the detecting valve spool 21, the third oil chamber 24, and the output pot 92. When the clutch chamber 8 is filled with oil, the filling is finished, and oil does not flow any more; therefore, the differential pressure, which is caused by the hole 77 between the second oil chamber 23 and the third oil chamber 24, does not exist. Thereby, the detecting valve spool 21 is moved in the rightward direction to return to its neutral position, and is further moved in the right direction as in the aforesaid prior art. From this movement, the filling sensor 80A detects that the clutch chamber 8 is filled with oil and that the filling is completed, as in the prior art.

Figure 7:
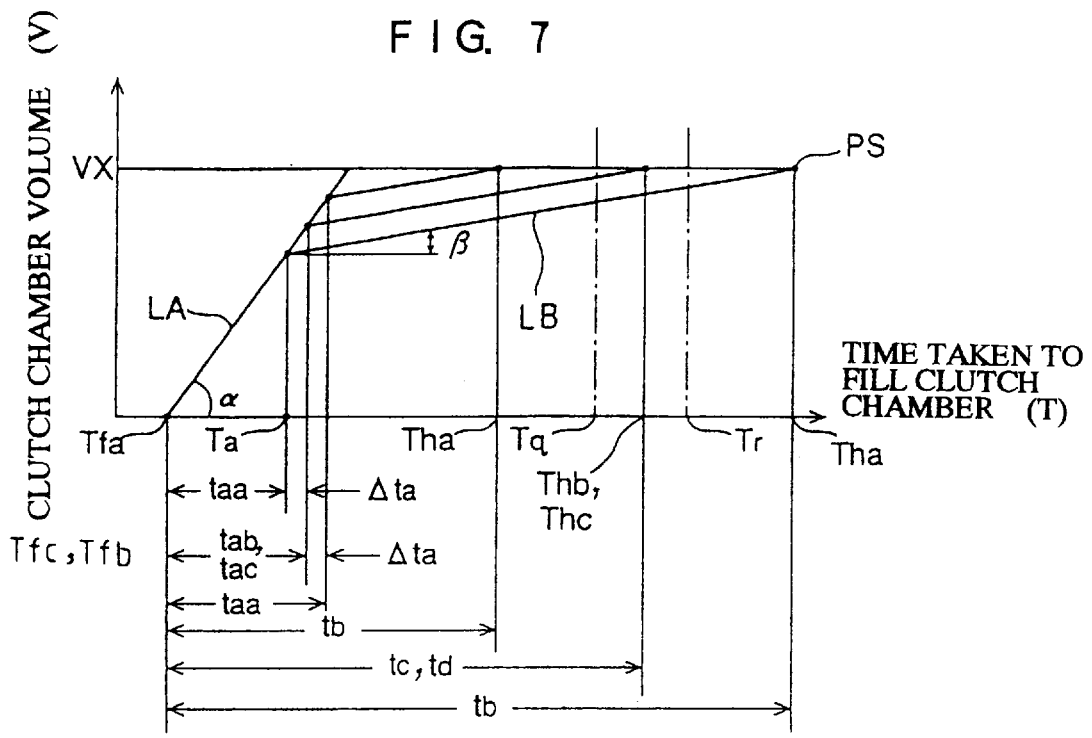
FIG. 7 is a diagram showing the relationship between a clutch volume and a time period required for engaging the clutch according to the embodiment of the present invention.

As described above, as a result that the flow rate into the clutch chamber 8 is controlled by the control valve spool 61, the increase ratio in the supply rate of the pressurized oil into the clutch chamber 8 from the hydraulic pump 4 has the gradient of the solid line LB from the point in time Ta, as shown in FIG. 7. Thereby, the clutch is smoothly engaged, and the wheel loader is allowed to travel with the clutch being smoothly coupled, without generating a shock, a noise, or the like.

Figure 3:
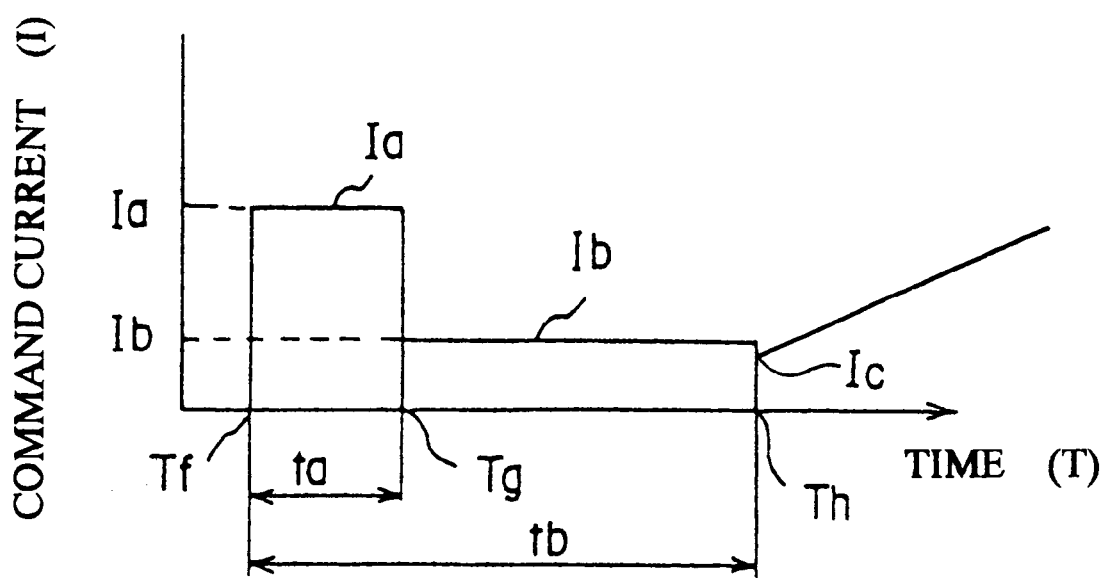
FIG. 3 is a time chart of a command signal to the clutch hydraulic control valve in FIG. 2.

The controller 2 inputs signals from the accelerator lever 5 and the transmission lever 6, and outputs a command for supplying the clutch chamber 8 with pressurized oil from the hydraulic pump 4, to the clutch hydraulic control valve 3 for a forward gear or a reverse gear, or a speed gear of the transmission, which is selected by the operator with the transmission lever 6. As for a command from the controller 2, a command current I is outputted as shown in FIG. 3. In FIG. 3, the time T is plotted in the axis of abscissa, and the command current I, outputted by the controller 2, is plotted in the axis of ordinates. As for the symbols in FIG. 3: Tf represents a point in time at which a speed change command is outputted; the command current Ia, from the period in time Tf to the period in time Tg, represents a trigger command value; the time interval ta from the period in time Tf to the period in time Tg, in which the command current is passed, represents the trigger time interval; Th represents a point in time at which filling is completed; and the time interval tb from the point in time Tf to the point in time Th, represents the filling time interval.

Figure 4:
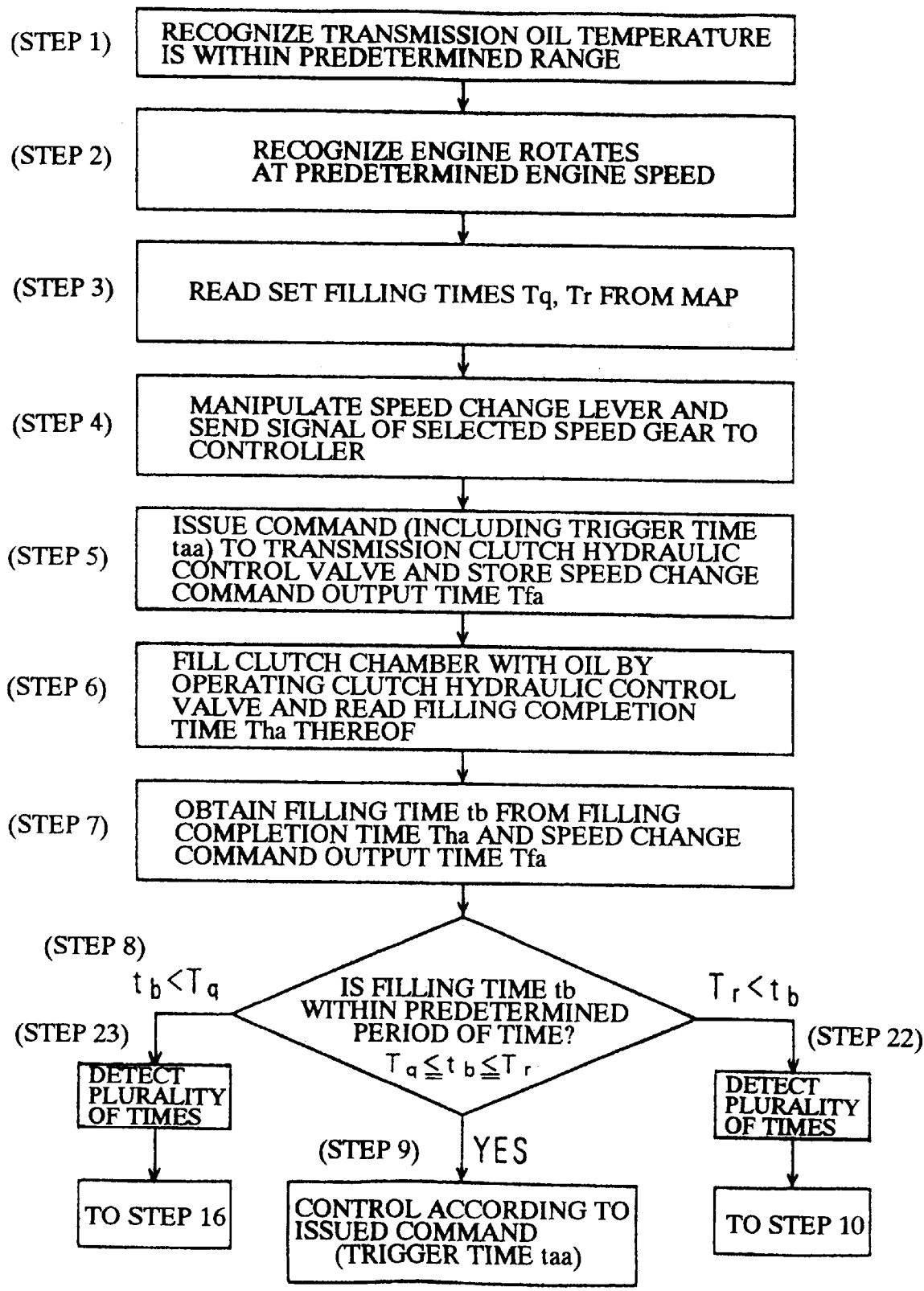
FIG. 4 is a flowchart of part of a control procedure according to the embodiment of the present invention.
Figure 5:
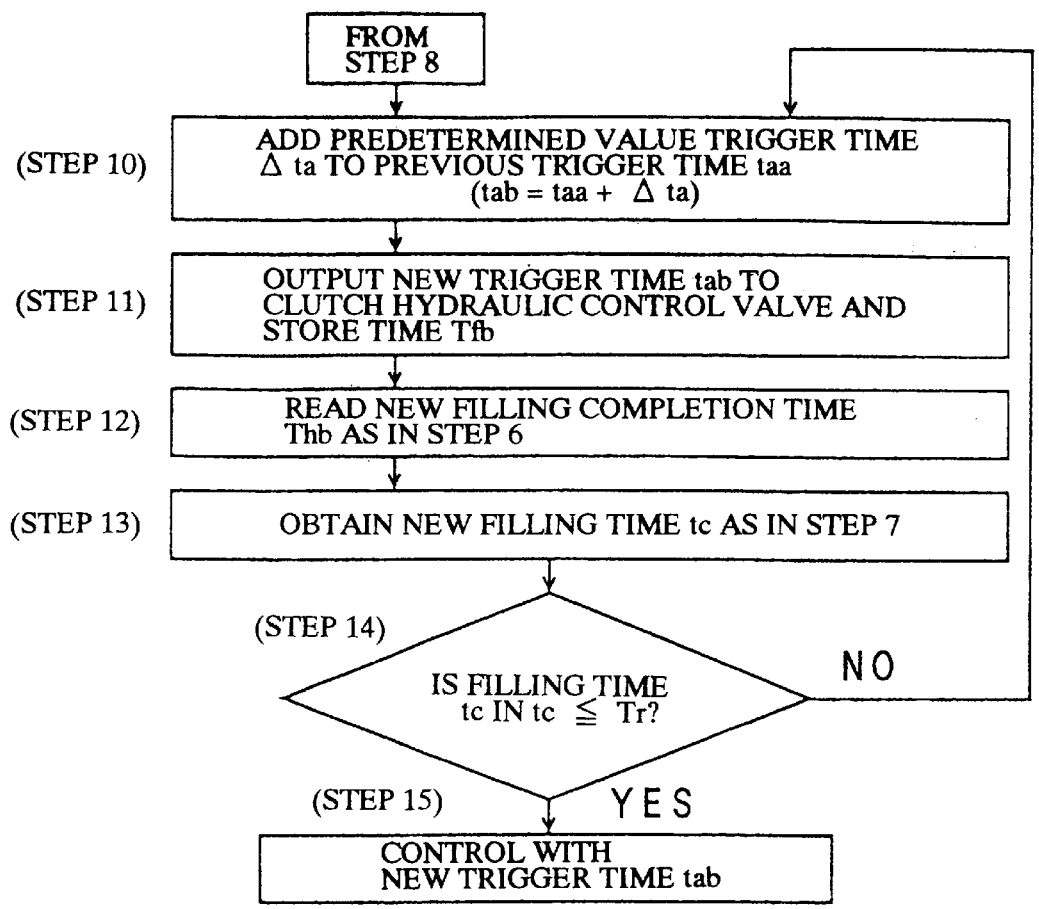
FIG. 5 is part of the flowchart continued from FIG. 4.
Figure 10:
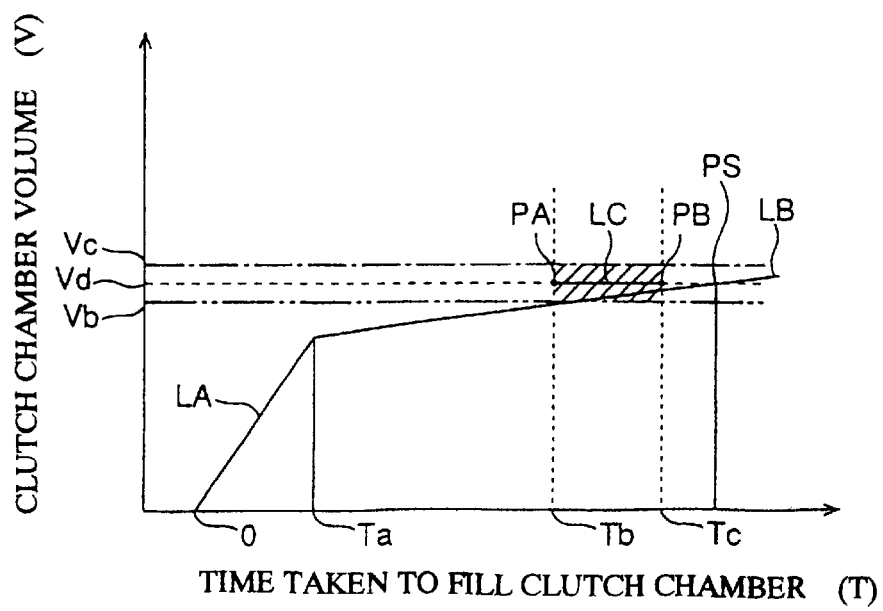
FIG. 10 is a diagram showing the relationship between the clutch volume and the time period required for engaging the clutch to explain the disadvantages of the prior art.

The operation of this configuration will be explained. FIG. 4 to FIG. 6 are flowcharts of a method for controlling the clutch hydraulic control valve 3 which, within a predetermined period of time, controls the period of time between a point in time when a command for engaging the clutch is issued and a point in time when the filling is completed. FIG. 7 is an explanatory diagram for engaging the clutch within a predetermined period of allowable time for engaging a clutch of the present embodiment, and the diagram corresponds to FIG. 10.

The following is an adjusting method to control the period of time taken to engage the clutch within a predetermined period of time in a situation in which the clutch chamber 8 has a predetermined volume Vx, when using the vehicle after it is assembled or with the clutch disc being worn. Here, the predetermined volume Vx=a clutch chamber area Ac×the moving quantity Sx of the clutch piston.

In step 1, the controller 2 recognizes whether the temperature of the oil of the transmission (the temperature of the oil for the torque converter when the oil of the torque converter is shared) falls within a predetermined range of values. In step 2, when the operator sets the engine 7 at a predetermined engine speed by manipulating the accelerator lever 5, the controller 2 recognizes the engine speed range. In step 3, the controller 2 reads a lower limit value Tq and an upper limit value Tr of the optimum set filling time interval corresponding to the recognized oil temperature and the recognized engine speed, which are previously stored as a map or the like, as the limits Tq and Tr of the optimum set filling time range in this situation.

In step 4, the operator sends a signal of a selected speed gear of the transmission to the controller 2 by manipulating the transmission level 6 (from the neutral gear N to the forward first speed gear F1, from the neutral gear N to the forward second speed gear F2, from the neutral gear N to the reverse gear R, or the like). In step 5, the controller 2 receives the selected speed gear signal from the transmission lever 6, issues a command to operate the corresponding clutch hydraulic control valve 3 of the control device 1, and stores the speed change command output time Tfa, i.e. the period in time at which the command is outputted. Alternatively, the controller 2 starts to count the elapsed time from the speed change command output period in time Tfa at which it outputted the command. The command is outputted in accordance with the time chart in FIG. 3. In step 6, by a command in accordance with the time chart, the clutch hydraulic control valve 3 is switched, and the clutch hydraulic control valve 3 supplies the pressurized oil from the hydraulic pump 4 to the clutch chamber 8.

Further explanation will be made with reference to FIG. 7. In the present embodiment, the controller 2 first outputs a current, having the trigger command value Ia, to the proportional solenoid 63 of the pressure control valve 10 of the clutch hydraulic control valve 3 for the trigger time interval taa. Thus, the control valve spool 61 of the pressure control valve 10 is greatly moved in the leftward direction, and thereby the pressurized oil from the hydraulic pump 4 flows into the clutch chamber 8 from the widely opened portion MA at the control valve spool 61 via the second oil chamber 23 of the detecting valve spool 21, the hole 77 of the detecting valve spool 21, the third chamber 24, and the output port 92. The quantity flowing into the clutch chamber 8 is large since the gradient $\alpha$ of the increase ratio is great. This is the supply of the pressurized oil to the clutch chamber 8 shown by the line LA in FIG. 7, in which a larger quantity is supplied to the clutch chamber 8 from the speed change command output point in time Tfa (engaging point time 0) to the point in time Ta, specifically, for the trigger time interval taa.

Next, when the trigger time interval taa has elapsed, the controller 2 outputs to the proportional solenoid 63 of the pressure control valve 10 a command value Ib having a lower value. Thereby, the amount of the movement of the control valve spool 61, which has moved greatly in the leftward direction, is decreased. For this reason, the pressurized oil from the hydraulic pump 4 flows into the clutch chamber 8 from a slightly opened portion MB at the control valve spool 61 via the second oil chamber 23 of the detecting valve spool 21, the hole 77 of the detecting valve spool 21, the third oil chamber 24, and the output port 92. The quantity flowing into the clutch chamber 8 is small since the gradient $\beta$ of the increase ratio is small. This is the supply of the pressurized oil to the clutch chamber 8 shown by the line LB in FIG. 7, which shows an increase ratio of the pressurized oil supply which does not cause a shock or a noise in the vehicle.

The pressurized oil fills the clutch chamber 8 (the situation represented by the point PS), the filling sensor 80A detects that the filling completion period in time Tha has come, and a signal is sent to the controller 2. Incidentally, it is suitable to read the terminal value of the counted elapsed time interval from the speed change command output point in time Tfa, which has started in response to the command in step 5. The controller 2 can output a command value Ic having a further reduced value at the filling completion time Th of the clutch chamber 8. Thereafter, due to the engagement of the clutch, the pressure in the clutch chamber 8 is raised, thereby the clutch is smoothly engaged with less slippage.

Returning to the flow, in step 7 the controller 2 obtains the filling time interval tb, based on the filling completion point in time Tha in step 6 and the speed change command output point in time Tfa in step 5. In step 8, it is determined whether or not the obtained filling time interval tb falls within the set range of filling time interval which is set in accordance with the temperature range and the engine speed range at the point in time when the speed is changed (the range from the lower limit value Tq to the upper limit value Tr). Specifically, it is determined whether or not the filling time interval tb is defined by: the lower limit value Tq of the set filling time interval≦the filling time interval tb≦the upper limit value Tr of the set filling time interval. When the filling time interval tb falls within the set range of the filling time interval (the range from the lower limit value Tq to the upper limit value Tr), a command is given to go to step 9. In step 9, the controller 2 outputs the same command value to the proportional solenoid 63 of the pressure control valve 10 for the next speed change.

In step 8, when the filling time interval tb is greater than the upper limit value Tr of the range of set filling time interval, a command is given to go to step 10. In step 10, the controller 2 adds an incremental trigger time interval Δta of a predetermined value to the trigger time interval taa of the previous processing occasion, and obtains a new trigger time interval tab (=taa+Δta). In step 11, the controller 2 outputs to the proportional solenoid 63 of the pressure control valve 10 a current with the trigger command value Ia for the new trigger time interval tab, and stores the point in time Tfb. In step 12, the clutch hydraulic control valve 3 is switched in response to a command of the new time chart, and as in step 6, the clutch hydraulic control valve 3 supplies the pressurized oil from the hydraulic pump 4 to the clutch chamber 8. The filling sensor 80A detects the new filling completion point in time Thb.

In step 13, the controller 2 obtains the new filling time interval tc from the filling completion point in time Thb in step 12 and the speed change command output point in time Tfb in step 11. In step 14, it is determined whether or not the obtained filling time interval tc is defined by tc≦the upper limit value Tr. If it is not, a command is given to return to step 10, and steps 10 through step 14 are repeated until tc ≦the upper limit value Tr. In step 14, when tc≦Tr, a command is given to go to step 15, and the controller 2 stores the new time chart, and issues a command to the proportional solenoid 63 of the pressure control valve 10 in accordance therewith. Specifically, control is performed according to the new trigger time interval tab.

When the filling time interval tb<the lower limit value Tq in step 8, a command is given to go to step 16, and the controller 2 obtains a new trigger time interval tac (=taa−Δta) by subtracting an incremental trigger time interval Δta of a predetermined value from the previous trigger time interval taa. In step 17, the controller 2 outputs to the proportional solenoid 63 of the pressure a current with the trigger command value Ia for the new trigger time interval tac, and stores the point in time Tfc thereof. In step 18, the clutch hydraulic control valve 3 is switched in response to a command of the new time chart, and as in step 6, the clutch hydraulic control valve 3 supplies the pressurized oil from the hydraulic pump 4 to the clutch chamber 8. The filling sensor 80A detects the filling completion point in time Thc.

In step 19, the controller 2 obtains the filling time interval td from the filling completion point in time Thc in step 18 and the speed change command output point in time Tfc in step 17. In step 20, it is determined whether or not the obtained filling time interval td is defined by td≧the lower limit value Tq. If it is not, a command is given to return to step 16, and steps 16 through 20 are repeated until td≧Tq. When td≧Tq, a command is given to go to step 21, and the controller 2 stores the new time chart and issues a command to the proportional solenoid 63 of the pressure control valve 10 in accordance therewith. Specifically, the control is performed according to the new trigger time interval tac.

According to the above, the new filling time interval tb falls with the filling time interval tc and td between the lower limit value Tq and the upper limit value Tr of the set filling time interval, and the clutch is smoothly engaged without causing a shock, a noise, or the like, thereby allowing the wheel loader to travel with the clutch being smoothly coupled.

The above description shows an example in which the determination in step 8, specifically, the determination of whether or not the measured filling time interval tb falls within a set range of filling time interval, is made only once. However, as is shown in steps 22 and 23, it is suitable to make the determination a plurality of times, and to give a command to go to step 10 or step 16 if each result is out of the set range of filling time interval at each of the plurality of times. Further, it is suitable to set the trigger time interval taa to output the trigger command value Ia in consideration of variations of the volume of the clutch chamber 8 as manufactured, if it is set after the vehicle is assembled. For example, it is suitable to collect the errors of the components and cause the filling completion point in time Th to fall within a set range of filling point in time Tq to filling point in time Tr when the volume is at the minimum. When the vehicle is used, or when the vehicle is used with the clutch disc being worn, it is suitable to store the previous trigger time interval taa, and to add the incremental trigger time interval Δta of a predetermined value thereto.

In the above, the flow rate and the pressure are controlled by means of the pressure control valve 10, and the completion of filling the clutch chamber 8 is detected by means of the detecting valve spool 21 of the flow rate detecting valve 20, but as for the completion of filling the clutch chamber 8, it is suitable to detect a change of the pressure by means of a pressure sensor (fullness detecting sensor) 97 shown in FIG. 1. It is suitable to change the trigger time interval ta by an operator with the use of a reset lever 98 to output the trigger command value Ia after a predetermined time, and it is also suitable for the operator to make the above change with the reset lever 98 when he or she feels a delay in engaging the clutch. Further, it is suitable to automatically make the above change at predetermined time intervals in response to the command from the controller 2 irrespective of the operator.

Industrial Availability

The present invention is useful as a control device and a control method for a transmission with a clutch, which are easily adjusted and which smoothly couple the clutch without causing a shock, a noise of clutch engaging, or the like in the vehicle, even when the engine speed is low.

What is claimed is:

1. A method for controlling a transmission with a clutch, which supplies oil from a hydraulic pump through a pressure control valve, which receives a speed change command, to a clutch chamber of a clutch for a speed gear which is selected from a plurality of speed gears, which moves a clutch piston in a selected clutch chamber, and which allows said clutch piston to press to engage the clutch to thereby transmit engine power by the selected speed gear; said method comprising the steps of:

supplying pressurized oil from said hydraulic pump;

transmitting a large trigger command value to said pressure control valve for a first predetermined period of time as said speed change command to pass thus supplied pressurized oil at a large initial flow rate to the clutch chamber;

before said clutch piston completes its movement, changing said large trigger command value to a smaller command value to supply pressurized oil to said clutch chamber at a flow rate which is smaller than that for said large trigger command value, to make said clutch chamber full;

detecting when said clutch chamber becomes full; and when a filling period of time, from a point in time at which said speed change command is transmitted until a point in time at which occurs a detection of said clutch chamber becoming full, does not fall within a predetermined range of allowable time intervals, controlling a filling period of time required for making the clutch chamber full to fall within a predetermined range of allowable time intervals.

2. A method in accordance with claim 1, wherein said step of controlling a period of time comprises obtaining a value of said second predetermined period of time by adding a predetermined incremental value to a value of said first predetermined period of time when said value of said filling period of time is less than a lower limit of said predetermined range of allowable time intervals and by subtracting a predetermined incremental value from said value of said first predetermined period of time when said value of said first predetermined filling period of time is greater than an upper limit of said predetermined range of allowable time intervals.

3. A method in accordance with claim 1, wherein said step of controlling a period of time comprises increasing or decreasing said first predetermined period of time by a predetermined unit time interval to obtain a second predetermined period of time as a new first predetermined period of time.

4. A method in accordance with claim 3, wherein said step of detecting when said clutch chamber becomes full comprises passing the pressurized oil to the clutch chamber via a flow rate detecting valve for detecting a flow rate of pressurized oil flowing to said clutch chamber.

5. A method in accordance with claim 3, wherein said step of detecting when said clutch chamber becomes full comprises sensing the pressure of oil in said clutch chamber.

6. In an apparatus comprising:
   a transmission;
   a clutch having a clutch chamber, with a clutch piston movably positioned in said clutch chamber for selectively engaging said clutch, said clutch chamber having a predetermined volume in which said clutch piston is movable;
   a hydraulic pump;
   a sensor for detecting when said clutch chamber is filled with pressurized oil;
   a pressure control valve, for controlling a supplying of pressurized oil from said hydraulic pump into said clutch chamber; and
   a controller;
   wherein, when said clutch is to be engaged, said controller outputs to said pressure control valve a large trigger command value for a first predetermined period of time to supply pressurized oil at a large initial flow rate to said clutch chamber to cause movement of said clutch piston toward engaging said clutch;
   wherein, before said clutch piston completes its movement, said controller reduces said large trigger command value to a smaller command value to supply oil to said clutch chamber at a flow rate which is smaller than said large initial flow rate;
   wherein said controller inputs a signal from said sensor indicating when said clutch chamber has become full; and
   wherein, when a filling period of time, from a point in time at which said large trigger command value is outputted to said pressure control valve until a point in time at which said signal from said sensor indicates that said clutch chamber becomes full, does not fall within a predetermined range of allowable time intervals, said controller outputs to said pressure control valve a large trigger command value for a second predetermined period of time which is a correction of said first predetermined period of time so as to cause a next filling period of time, required for making the clutch chamber full, to fall within the predetermined range of allowable time intervals.

7. An apparatus in accordance with claim 6, wherein said sensor comprises a flow rate detecting valve;

wherein said pressure control valve supplies pressurized oil from said hydraulic pump into said clutch chamber via said flow rate detecting valve;

wherein, when said clutch is to be engaged, said controller outputs to said pressure control valve said large trigger command value for said first predetermined period of time to supply pressurized oil at said large initial flow rate to said clutch chamber via said flow rate detecting valve to cause movement of said clutch piston toward engaging said clutch; and wherein said controller inputs a signal from said flow rate detecting valve indicating when said clutch chamber has become full.

8. An apparatus in accordance with claim 6, wherein said sensor comprises a fullness detecting sensor for detecting that said clutch chamber is filled with pressurized oil; and wherein said controller inputs a signal from said fullness detecting sensor indicating when said clutch chamber has become full.

9. An apparatus in accordance with claim 6, wherein said controller obtains a value of said second predetermined period of time by adding a predetermined incremental value to a value of said first predetermined period of time when a value of said filling period of time is less than a lower limit of said predetermined range of allowable time intervals and by subtracting a predetermined incremental value from a value of said first predetermined period of time when said value of said filling period of time is greater than an upper limit of said predetermined range of allowable time intervals.

10. An apparatus in accordance with claim 6, wherein said pressure control valve effects a smooth engagement of said clutch upon receiving a trigger command value from said controller.

11. An apparatus in accordance with claim 6, wherein said controller obtains a value of said second predetermined period of time by increasing or decreasing a value of said first predetermined period of time.

12. An apparatus in accordance with claim 6, further comprising an engine, wherein said clutch corresponds to one of a plurality of speed gears, and wherein engagement of said clutch transmits power from said engine by the corresponding one of said plurality of speed gears.

13. An apparatus in accordance with claim 5, further comprising a lever for selecting a desired one of said plurality of speed gears and for outputting a signal to said controller indicating a selected speed gear.

14. An apparatus in accordance with claim 13, wherein said controller obtains a value of said second predetermined period of time by increasing or decreasing a value of said first predetermined period of time.

15. An apparatus in accordance with claim 13, wherein said controller obtains a value of said second predetermined period of time by adding a predetermined incremental value to a value of said first predetermined period of time when a value of said filling period of time is less than a lower limit of said predetermined range of allowable time intervals and by subtracting a predetermined incremental value from a value of said first predetermined period of time when said value of said filling period of time is greater than an upper limit of said predetermined range of allowable time intervals.

* * * * *

UNITED STATES PATENT AND TRADEMARK OFFICE
CERTIFICATE OF CORRECTION

PATENT NO.    : 6,088,645
DATED         : July 11, 2000
INVENTOR(S)   : Nobuaki Kawasaki et al.

It is certified that error appears in the above-identified patent and that said Letters Patent is hereby corrected as shown below:

Title page,
Item [75] Inventors,
Line 2, delete "Komatsu;", and insert -- Komatsu-Shi; --.
Line 3, delete "Kanazawa,", and insert -- Kanazawa-Shi, --.

Column 13,
Line 4 (claim 2, line 10), delete "first predetermined".

Column 14,
Line 45 (claim 13, line 1), delete "claim 5", and insert -- claim 12 --.

Signed and Sealed this

Twenty-third Day of October, 2001

*Attest:*

NICHOLAS P. GODICI

*Attesting Officer*   *Acting Director of the United States Patent and Trademark Office*